United States Patent
Hagan

[11] Patent Number: 5,904,289
[45] Date of Patent: May 18, 1999

[54] REUSABLE GIFT WRAP

[76] Inventor: Laura J. Hagan, 4677 Hadfield Dr., Sarasota, Fla. 34235-2324

[21] Appl. No.: 08/833,417

[22] Filed: Apr. 4, 1997

[51] Int. Cl.⁶ .................................................... B65D 65/10
[52] U.S. Cl. ......................................................... 229/87.19
[58] Field of Search ........................... 383/4; 229/87.18, 229/87.19; 206/575; 150/154

[56] References Cited

U.S. PATENT DOCUMENTS

| | | | |
|---|---|---|---|
| 1,291,480 | 1/1919 | Gore | 229/87.18 X |
| 3,202,193 | 8/1965 | Ware | 150/154 X |
| 3,366,313 | 1/1968 | Culberg et al. | 229/87.19 |
| 4,620,396 | 11/1986 | Bjornwedt | 383/4 X |
| 4,631,765 | 12/1986 | Cassey | 5/417 |
| 4,726,509 | 2/1988 | Fonas . | |
| 4,826,712 | 5/1989 | Theno | 229/87.19 X |
| 4,967,952 | 11/1990 | Roessiger . | |
| 5,004,144 | 4/1991 | Selga . | |
| 5,251,759 | 10/1993 | Gannon et al. | 229/87.19 X |
| 5,292,003 | 3/1994 | Baghdassarian | 229/87.19 X |
| 5,392,983 | 2/1995 | Clarke-Bolling et al. . | |

Primary Examiner—Jes F. Pascua

[57] ABSTRACT

A reusable gift wrap to envelop a gift box forming a unitary fabric sheet with fastening means attached to the outer surface and inner surfaces of the fabric sheet. The reusable fabric gift wrap does not have to be exactly matched to the box size, but can be adapted to fit the size of the gift box or package. The preferred fastening means may be releasable flexible hook and loop type fasteners. The reusable gift wrap can be washed and the hook and loop type fastening means may be removed before washing or replaced after washing, if necessary. Alternative fastening means may be snap type closures, two sided tape or eyelet type closures. The reusable gift wrap can also be in the form of a kit containing one or more fabric sheets that can be cut to size with fastening means provided.

2 Claims, 3 Drawing Sheets

REUSABLE GIFT WRAP

BACKGROUND

The invention relates generally to an apparatus that is a reusable gift wrap and more particularly, to a reusable gift wrap to be used for packages, preferably made of fabric, having fastening means strategically placed along and near the fabric edges. When a package is wrapped with the reusable gift wrap, it surrounds the box similarly to traditional paper gift wrap, and the fastening means are completely or partially hidden from view. The reusable fabric gift wrap does not have to be exactly matched to the box size, so it can be adapted to fit a number of sizes of packages.

Traditionally, gift wrapping of boxes involves separately purchasing paper, bows, ribbons, and tape. Then the paper must be cut to size and the tape cut to the right size and applied. When the gift is opened, the wrap is usually discarded. Even if the wrap is desired to be saved, the fragility of the paper and inability to remove the tape without ripping the paper, make reuse impracticable. Disposable gift wrapping can be expensive, especially when the cost to the environment of disposal is considered.

Other reusable gift wrappings have been designed. One such design provides for a fabric wrap secured with fasteners, however, the fabric wrap is composed of multiple pieces that must be cut, hemmed and sewn together, increasing the manufacturing cost of the wrap. In addition, this same design requires that the wrap size as manufactured exactly fit the gift box the wrap is to cover. If the box size varies slightly, the fasteners will not allow the wrap to stay secured around the box and will not give the package a smooth appearance. In addition, since the fasteners are a Velcro™ type material and are permanently attached to the wrap, if the fabric is to be reused and washed, the fasteners can accumulate debris during washing. In addition, if the wrap is continually reused, the fasteners may become loose and the wrap would no longer be of use.

Another type of reusable wrap design also consists of multiple pieces of fabric that must be sewn or otherwise attached to each other which increases the manufacturing time and cost. This same design also provides for an adhesive coating to be applied to the edges of the fabric wrap. This adhesive coating however, will adhere on contact to any portion of the fabric, which also means that it will adhere as well to other objects that one does not want to be part of the gift wrapped package. In addition, if the fabric is to be reused and washed, the adhesive coating will eventually lose its adhesive properties during washing, but until it does so, it will also adhere both to itself and to other fabrics in the wash. If the adhesive is applied after the wrap is sold, it requires some hours of drying time before it can be used, which may delay wrapping the gift.

For the foregoing reasons, there is a need, therefore for a one piece reusable gift wrap, that does not have to match the size of the gift box exactly, with fasteners that allow some adjustment of the gift wrap to fit various box sizes, capable of either being washed without affecting the fastening capability of the fasteners, or if the fasteners are Velcro™ type hook and loop fasteners, the fasteners may be removed prior to washing and then quickly and easily reapplied, with no need to apply adhesive or tape to the gift wrap, is easily and inexpensively fabricated and assembled, simple to use, and gives the wrapped package a smooth appearance.

SUMMARY

The present invention is directed to a device that satisfies these needs. The present invention provides for a one piece reusable gift wrap, that does not have to match the size of the gift box exactly, with fasteners that allow some adjustment of the gift wrap to fit various box sizes, capable of either being washed without affecting the fastening capability of the fasteners, or if the fasteners are Velcro™ type hook and loop fasteners, the fasteners may be removed prior to washing and then quickly and easily reapplied, with no need to apply adhesive or tape to the gift wrap, is easily and inexpensively fabricated and assembled, simple to use, and gives the wrapped package a smooth appearance. In addition, since the fabric edge may be unhemmed, the unhemmed edge of the fabric may be folded over and the fasteners then strategically placed along and near the folded fabric edges. Besides creating a smooth appearance, this use of the fasteners allows the reusable fabric gift wrap to be adapted to fit a number of sizes of packages.

A reusable give wrap having features of the present invention comprises a unitary fabric sheet with four edges and an outer and inner surface large enough to envelop the gift box to be wrapped. A fastening means is attached to the first edge of the outer surface of the unitary fabric sheet and to the second edge of the inner surface of the unitary fabric sheet, 180 degrees opposite from the first edge, so that when the inner surface of the sheet surrounds the gift box, the fastening means holds the first and second edges of the inner surface of the unitary sheet securely around the gift box. A fastening means is attached to the third edge and to the fourth edge of the inner surface of the unitary fabric sheet, 180 degrees opposite from the third edge, and to the third and fourth edges of the outer surface of the unitary fabric sheet so when the fabric sheet is wrapped around the gift box, the fastening means hold the third and fourth edges of the fabric sheet securely around the gift box.

In one embodiment of the invention, the fastening means are releasable flexible hook and loop fastening contact strips positioned so as to fasten the fabric sheet the edges securely around the gift box.

In an alternative embodiment of the invention, the fastening means are removably attached to the edges of the unitary fabric sheet.

In an alternative embodiment of the invention, the fastening means are snap type closures.

In an alternative embodiment of the invention, the fastening means are eyelet type closures containing two parts, with the first part having a hooking means attached to the edges of inner surface of the fabric sheet and the second part having a loop means attached to the edges of the outer surface of the fabric sheet, so that when the eyelet type closure is secured, the hook means is attached around the loop means so as to fasten the fabric sheet securely around the gift box.

In an alternative embodiment of the invention, the fastening means are two sided tape.

In an alternative embodiment of the invention, the fabric sheet is reversible.

In an alternative embodiment of the invention, a fabric bow and ribbon is removably attached to the outer surface of the fabric sheet.

In an alternative embodiment of the invention, the unitary fabric sheet is stitched around the edges.

In an alternative embodiment of the invention, the reusable gift wrap is in the form of a kit comprising an expanse of fabric with four edges and an outer and inner surface large enough to be cut to size to envelop the gift box to be wrapped. A plurality of fastening means are attached to the first edge of the outer surface of the unitary fabric sheet and to the second edge of the inner surface of the unitary fabric sheet, 180 degrees opposite form the first edge, so that when the inner surface of the sheet surrounds the gift box, the fastening means hold the first and second edges of the inner surface of the unitary sheet securely around the gift box. A plurality of fastening means are attached to the third edge and to the fourth edge of the inner surface of the unitary fabric sheet, 180 degrees opposite from the third edge, and to the third and fourth edges of the outer surface of the unitary fabric sheet so when the fabric sheet is wrapped around the gift box, the fastening means hold the third and fourth edges of the fabric sheet securely around the gift box.

In an alternative embodiment of the invention, the kit comprises fastening means that are releasable flexible hook and loop fastening contact strips positioned so as to fasten the fabric sheet the edges securely around the gift box.

In an alternative embodiment of the invention, the kit comprises fastening means that may be removably attached to the edges of the unitary fabric sheet.

In an alternative embodiment of the invention, the kit comprises fastening means that are snap type closures.

In an alternative embodiment of the invention, the kit comprises fastening means of eyelet type closures containing two parts, with the first part having a hooking means attached to the edges of inner surface of the fabric sheet and the second part having a loop means attached to the edges of the outer surface of the fabric sheet, so that when the eyelet type closure is secured, the hook means is attached around the loop means so as to fasten the fabric sheet securely around the gift box.

In an alternative embodiment of the invention, the kit comprises fastening means that are two sided tape.

In an alternative embodiment of the invention, the kit comprises an expanse of fabric that is reversible.

In an alternative embodiment of the invention, the kit comprises a fabric bow and ribbon that is removably attached to the outer surface of the fabric sheet.

In an alternative embodiment of the invention, the kit comprises one or more gift boxes.

In an alternative embodiment of the invention, the kit comprises fastening means that allow for the adjustment of the fabric around the gift box so the fabric does not have to exactly match the size of the gift box.

In an alternative embodiment, the four edges of the unitary fabric sheet are unhemmed, the four edges of the outer surface fabric sheet are folded over the inner surface of the fabric sheet so as to make four smooth edges, the fastening means are attached so as to secure the folded edges in place, and the fastening means allow for the size of the fabric to be adjusted by varying the size of the outer surface folded over the inner surface of the fabric so as to match the size of the gift box.

In an alternative embodiment of the invention, the unitary fabric sheet is a flat material.

In an alternative embodiment of the invention, the unitary fabric sheet is rectangular.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
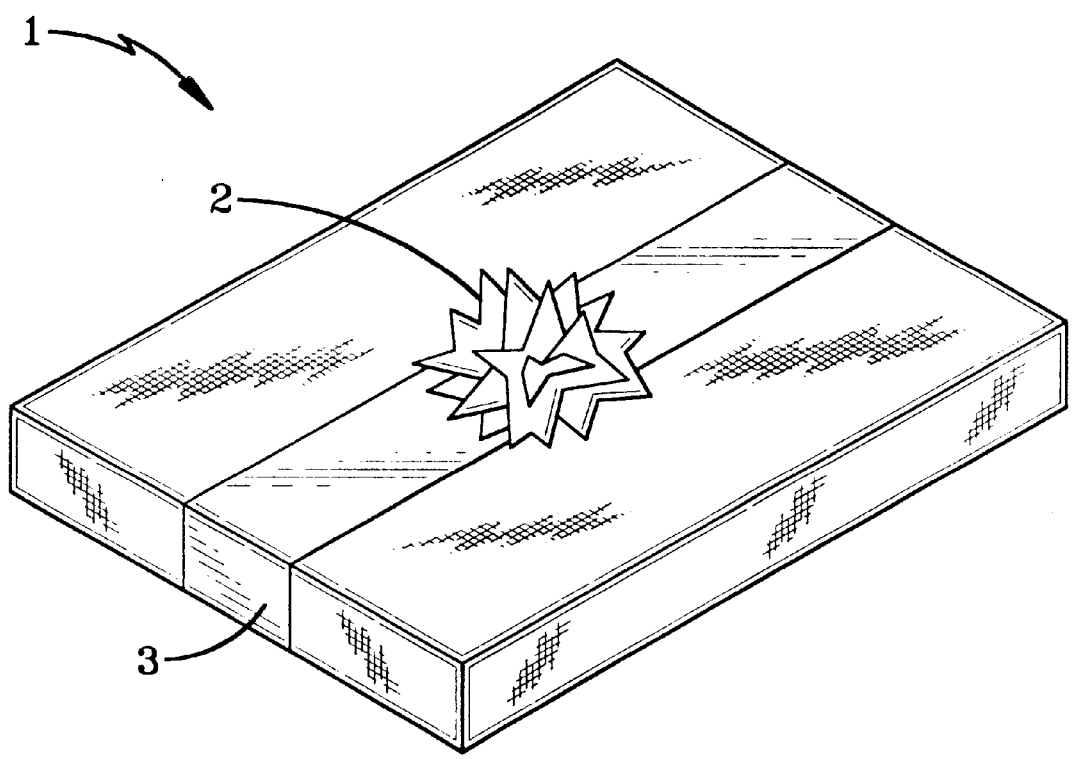
FIG. 1 shows a perspective view of the reusable gift wrap embodying features of the present invention.

Turning now to FIG. 1, a preferred embodiment of the reusable gift wrap 1, is shown in accordance with the present inventive concepts. The reusable gift wrap 1 is shown surrounding a gift box with a removable bow 2 and ribbon attached 3.

Figure 2:
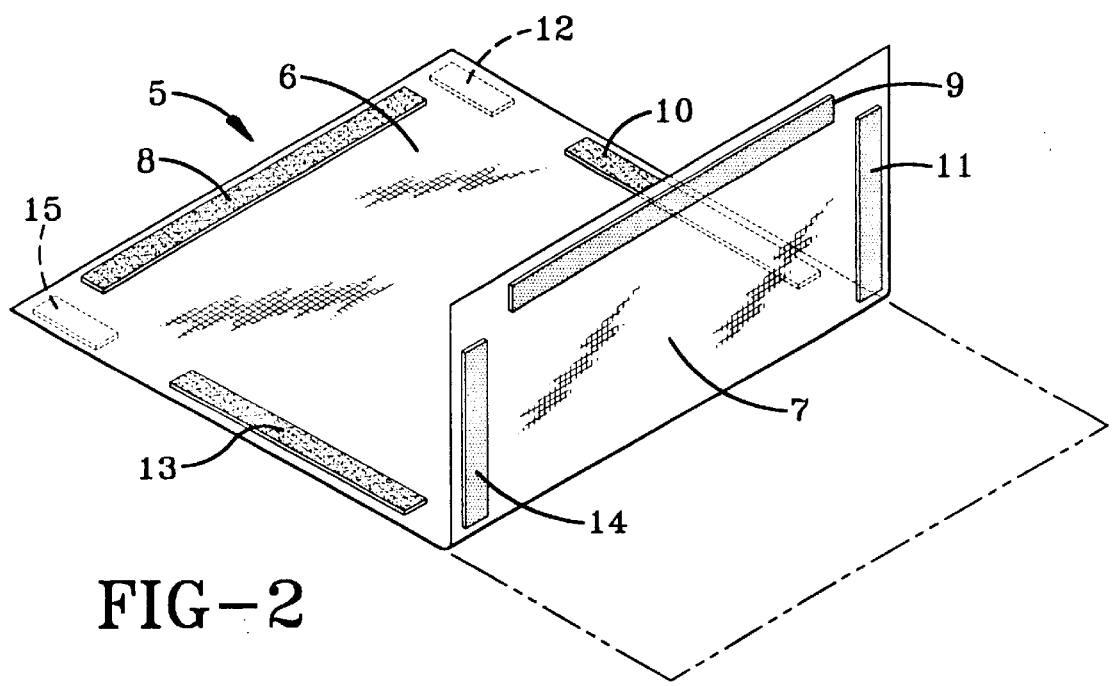
FIG. 2 shows a perspective view of a preferred embodiment of the reusable gift wrap, illustrating the type and location of the fasteners embodying features of the present invention.

Turning now to FIG. 2, a preferred embodiment of the reusable gift wrap 5 is shown in accordance with the present inventive concepts. The reusable gift wrap 5 is partially folded to show the location of releasable hook and loop fastening strips. The reusable gift wrap 5 has an inner surface 6 and an outer surface 7. A fastening strip 8 is attached to one edge of the inner surface 6 of the gift wrap 5 and another fastening strip 9 is attached to the one edge of the outer surface 7 of the gift wrap 5, so when the inner surface 6 is folded over the outer surface 7, the fastening strip 8 will securely engage the fastening strip 9. A fastening strip 10 is attached to another edge of the inner surface 6 and fastening strips 11 and 12 are attached to the outer surface 7 of the gift wrap 5 so when the inner surface 6 is folded over the outer surface 7, the fastening strip 10 will securely engage the fastening strips 11 and 12. A fastening strip 13 is attached to another edge of the inner surface 6 and fastening strips 14 and 15 are attached to the outer surface 7 of the gift wrap 5 so when the inner surface 6 is folded over the outer surface 7, the fastening strip 13 will securely engage the fastening strips 14 and 15. The hook and loop fastening strips may be attached to the surfaces of the fabric using any attaching means known to one skilled in the art. For example, adhesive backing is often found on one side of the hook and loop strips to secure the fabric or they may be sewn in place.

Figure 3:
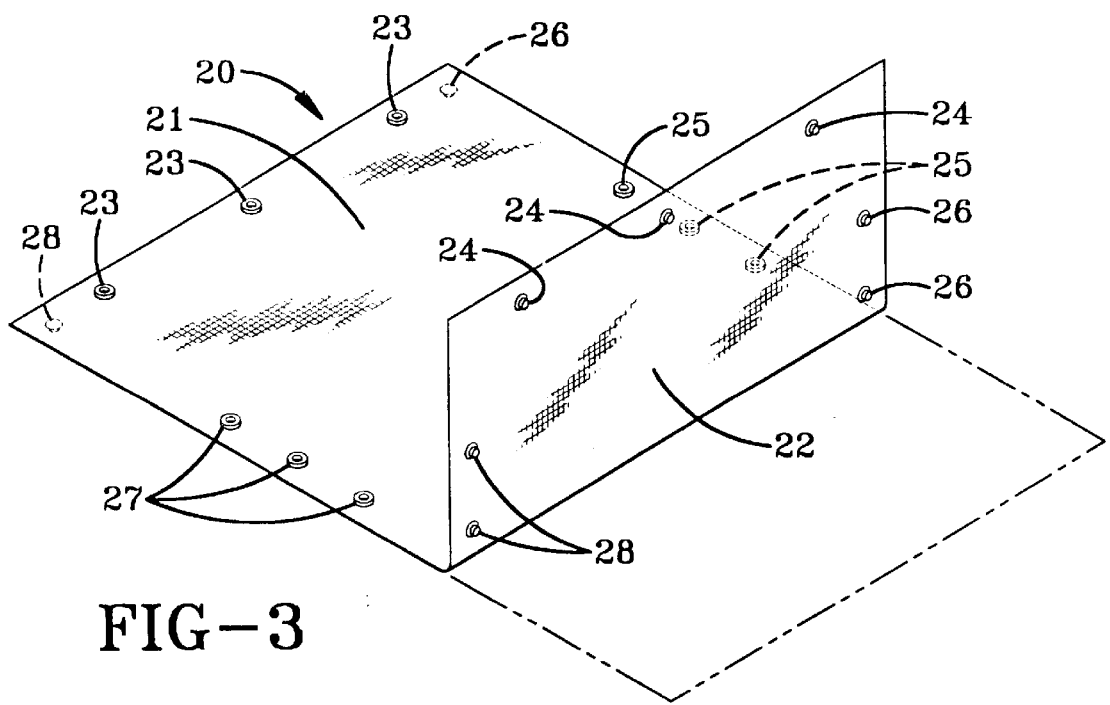
FIG. 3 shows a perspective view of an alternative embodiment of the reusable gift wrap, illustrating the type and location of the fasteners embodying features of the present invention.

Turning now to FIG. 3, an alternate embodiment of the reusable gift wrap 20 is shown in accordance with the present inventive concepts. The reusable gift wrap 20 is partially folded to show the location of snap type fastening means. The reusable gift wrap 20 has an inner surface 21 and an outer surface 22. One side of snaps 23 is attached to one edge of the inner surface 21 of the gift wrap 20 and the corresponding side of the snaps 24 is attached to the one edge of the outer surface 22 of the gift wrap 20, so when the inner surface 21 is folded over the outer surface 22, one side of the snaps 23 will securely engage the corresponding sides of the snaps 24. One side of the snaps 25 is attached to another edge of the inner surface 21 and the other side of the snaps 26 is attached to the outer surface 22 of the gift wrap 20 so when the inner surface 21 is folded over the outer surface 22, one side of the snaps 25 will securely engage the other side of the snaps 26. One side of the snaps 27 is attached to another edge of the inner surface 21 and the other side of the snaps 28 is attached to the outer surface 22 of the gift wrap 20 so when the inner surface 21 is folded over the outer surface 22, one side of the snaps 27 will securely engage the other side of the snaps 28. The snap type fasteners may be attached to the surfaces of the fabric using any attaching means known to one skilled in the art. For example, a hand held tool may be used that attaches the snaps to the fabric when a snap is inserted into the tool and the handle of the tool is squeezed.

Figure 4:
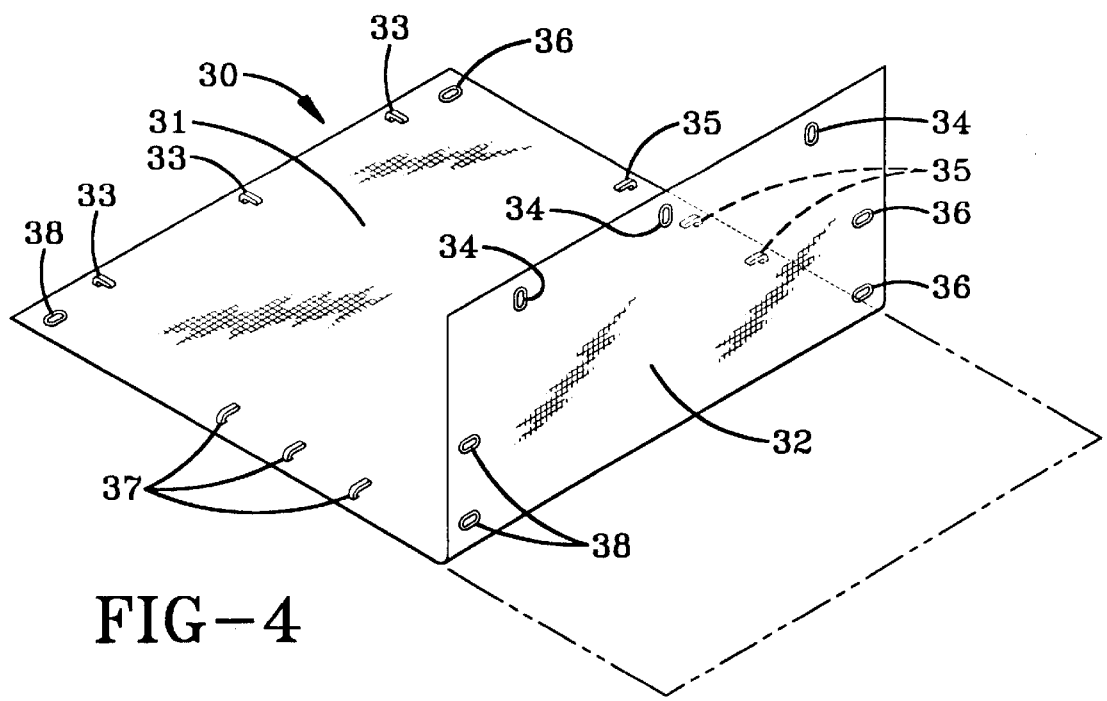
FIG. 4 shows a perspective view of an alternative embodiment of the reusable gift wrap, illustrating the type and location of the fasteners embodying features of the present invention.

Turning now to FIG. 4, an alternate embodiment of the reusable gift wrap 30 is shown in accordance with the present inventive concepts. The reusable gift wrap 30 is partially folded to shown the location of eyelet hook type fastening means. The reusable gift wrap 30 has an inner surface 31 and an outer surface 32. The hook side of the eyelet snaps 33 are attached to one edge of the inner surface 31 of the gift wrap 30 and the corresponding eye sides of the eyelet hooks 34 are attached to the one edge of the outer surface 32 of the gift wrap 30, so when the inner surface 31 is folded over the outer surface 32, the hook side of the eyelet hooks 33 will securely engage the corresponding eye sides of the eyelet hooks 34. The hook sides of the eyelet hooks 35 are attached to another edge of the inner surface 31 and the corresponding eye sides of the eyelet hooks 36 are attached to the outer surface 32 of the gift wrap 30 so when the inner surface 31 is folded over the outer surface 32, the hook side of the eyelet hooks 35 will securely engage the corresponding eye sides of the eyelet hooks 36. The hook sides of the eyelet hooks 37 are attached to another edge of the inner surface 31 and the corresponding eye sides of the eyelet hooks 38 are attached to the outer surface 32 of the gift wrap 30 so when the inner surface 31 is folded over the outer surface 32, the hook side of the eyelet hooks 37 will securely engage the corresponding eye sides of the eyelet hooks 38. The eyelet hook type fastening means may be attached to the surfaces of the fabric using any attaching means known to one skilled in the art, for example, they may be sewn in place.

Figure 5:
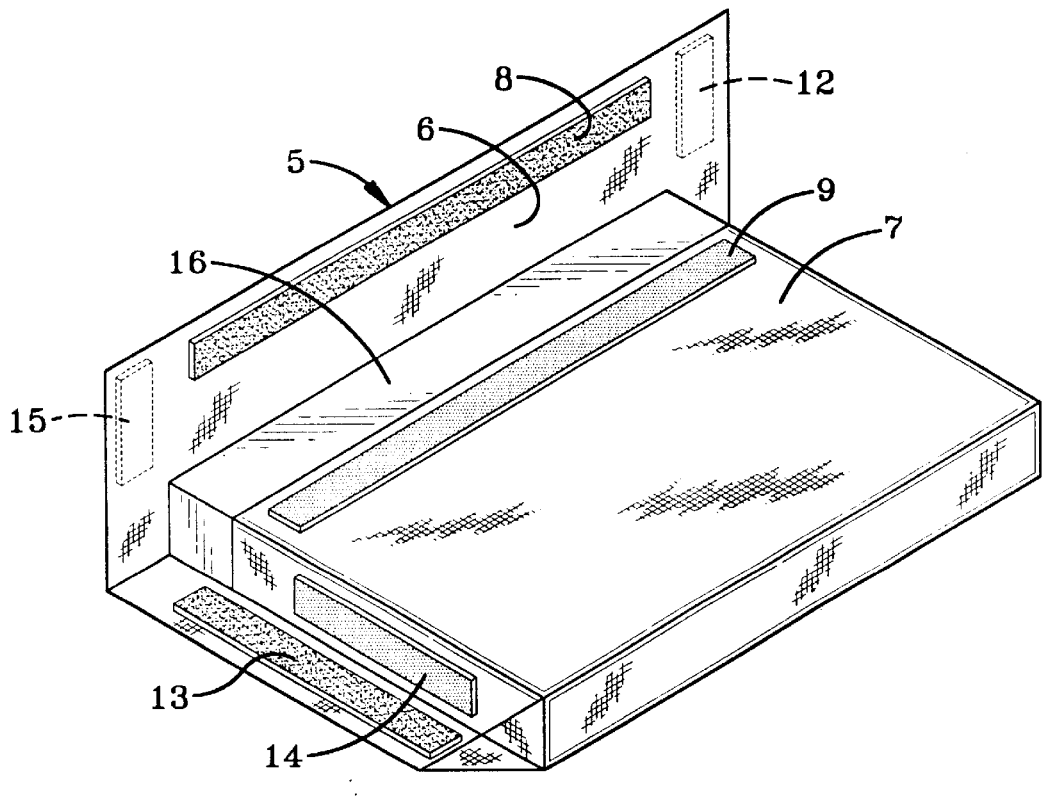
FIG. 5 shows a view of an alternate embodiment of the reusable gift wrap of FIG. 2, illustrating a box partially enveloped by the reusable gift wrap embodying features of the present invention.

Turning now to FIG. 5, an alternate embodiment of the reusable gift wrap 5 of FIG. 2, is shown in accordance with the present inventive concepts. A gift box 16 is shown partially enveloped by the reusable gift wrap 5. The reusable gift wrap 5 has an inner surface 6 which faces the gift box 16 when the gift wrap 5 is in place surrounding the gift box 16. The fastening strips 8 through 14 may be two sided tape. The outer surface 7 of the gift wrap 5 faces away from the gift box 16. A fastening strip 8 is attached to one edge of the outer surface 7 of the gift wrap 5 and another fastening strip 9 is attached to the one edge of the inner surface 6 of the gift wrap 5, so when the inner surface 6 facing the gift box 16 is folded over the outer surface 7, the fastening strip 9 will securely engage the fastening strip 8. A fastening strip 10 is attached to another edge of the inner surface 6 and fastening strips 11 and 12 are attached to the outer surface 7 of the gift wrap 5 so when the inner surface 6 facing the gift box 16 is folded over the outer surface 7, the fastening strip 10 will securely engage the fastening strips 11 and 12.

Although the present invention has been described in considerable detail with reference to certain preferred embodiments thereof, other embodiments are possible. Therefore, the spirit and scope of the appended claims should not be limited to the description of the preferred embodiments herein.

What is claimed is:

1. A reusable gift wrap to envelop a gift box, comprising:
   a. a unitary fabric sheet having four edges with an outer and inner surface of a size large enough to envelop the gift box;
   b. fastening means attached to the first edge of the outer surface of the unitary fabric sheet and to the second edge of the inner surface of the unitary fabric sheet, 180 degrees opposite from the first edge, so that when the inner surface of the sheet surrounds the gift box, the fastening means holds the first and second edges of the inner surface of the unitary sheet securely around the gift box;
   c. fastening means attached to the third edge and to the fourth edge, 180 decrees opposite from the third edge, of the inner surface of the unitary fabric sheet and to the third and fourth edges of the outer surface of the unitary fabric sheet so when the fabric sheet is wrapped around the gift box, the fastening means hold the third and fourth edges of the fabric sheet securely around the gift box; and
   d. a fabric bow and ribbon removably attached to the outer surface of the fabric sheet.

2. A kit of reusable gift wrap to envelop a gift box, comprising:
   a. an expanse of fabric to be cut into one or more unitary fabric sheets of a size sufficient to envelop a gift box;
   b. a plurality of fastening means for attaching to one or more unitary fabric sheets, to the first edge of the outer surface of the unitary fabric sheet and to the second edge of the inner surface of the unitary fabric sheet 180 degrees opposite from the first edge, so that when the inner surface of the sheet surrounds the gift box, the fastening means holds the first and second edges of the inner surface of the fabric securely around the gift box;
   c. a plurality of fastening means attached to the third edge and to the fourth edge, 180 degrees opposite from the third edge, of the inner surface of the unitary fabric sheet and to the third and fourth edges of the outer surface of the unitary fabric sheet so when the fabric sheet is wrapped around the gilt box, the fastening means hold the third and fourth edges of the fabric sheet securely around the gift box; and
   d. a fabric bow and ribbon removably attached to the outer surface of the fabric sheet.

* * * * *